United States Patent [19]
Low et al.

[11] 3,856,402
[45] Dec. 24, 1974

[54] CLEAR AIR TURBULENCE DETECTOR

[76] Inventors: George M. Low, Administrator of the National Aeronautics and Space Administration with respect to an invention of; Werner K. Dahm, 7605 Martha Dr. S.E., Huntsville, Ala. 35803; Donald J. Delgrego, 3 Edgar Rd., Billerica, Mass. 01821; Irving Goldstein, 77 Pond Ave., Brookline, Mass. 02146; Robert M. Huffaker, Rt. 4, Box 1842, Huntsville, Ala. 35803; Albert V. Jelalian, 3 Reeves Rd., Bedford, Mass. 01730; Wayne H. Keene, 6 Homestead Dr., Medfield, Mass. 02052; Perry A. Miles, 3 Dewey Rd., Lexington, Mass. 02173; Charles M. Sonnenschein, 19 Nimitz Cir., Natick, Mass. 01760

[22] Filed: Apr. 11, 1973

[21] Appl. No.: 350,249

[52] U.S. Cl. ............... 356/5, 356/28, 356/103
[51] Int. Cl. ................................................. G01c 3/08
[58] Field of Search ................. 356/5, 28, 103

[56] References Cited
UNITED STATES PATENTS

| | | | |
|---|---|---|---|
| 3,528,741 | 9/1970 | Benson et al. | 356/28 |
| 3,738,750 | 6/1973 | Kalb et al. | 356/28 |

OTHER PUBLICATIONS

Weaver, NASA Special Publ. 270, May 4–6, 1971, Paper No. 7, p. 89–100.
Huffaker, Applied Optics, May 1970, Vol. 9, No. 5, p. 1026–1039.

*Primary Examiner*—Maynard R. Wilbur
*Assistant Examiner*—S. C. Buczinski
*Attorney, Agent, or Firm*—George J. Porter; L. D. Wofford, Jr.; John R. Manning

[57] ABSTRACT

A system to be employed by an aircraft for the detection of clear air turbulance (C.A.T.) in which a pulse laser light beam is directed ahead of the flight path of the aircraft and the portion of this light reflected back to the aircraft by atmospheric aerosol is detected and analyzed for doppler shift and thus the velocity and intensity of the turbulence is determined.

12 Claims, 9 Drawing Figures

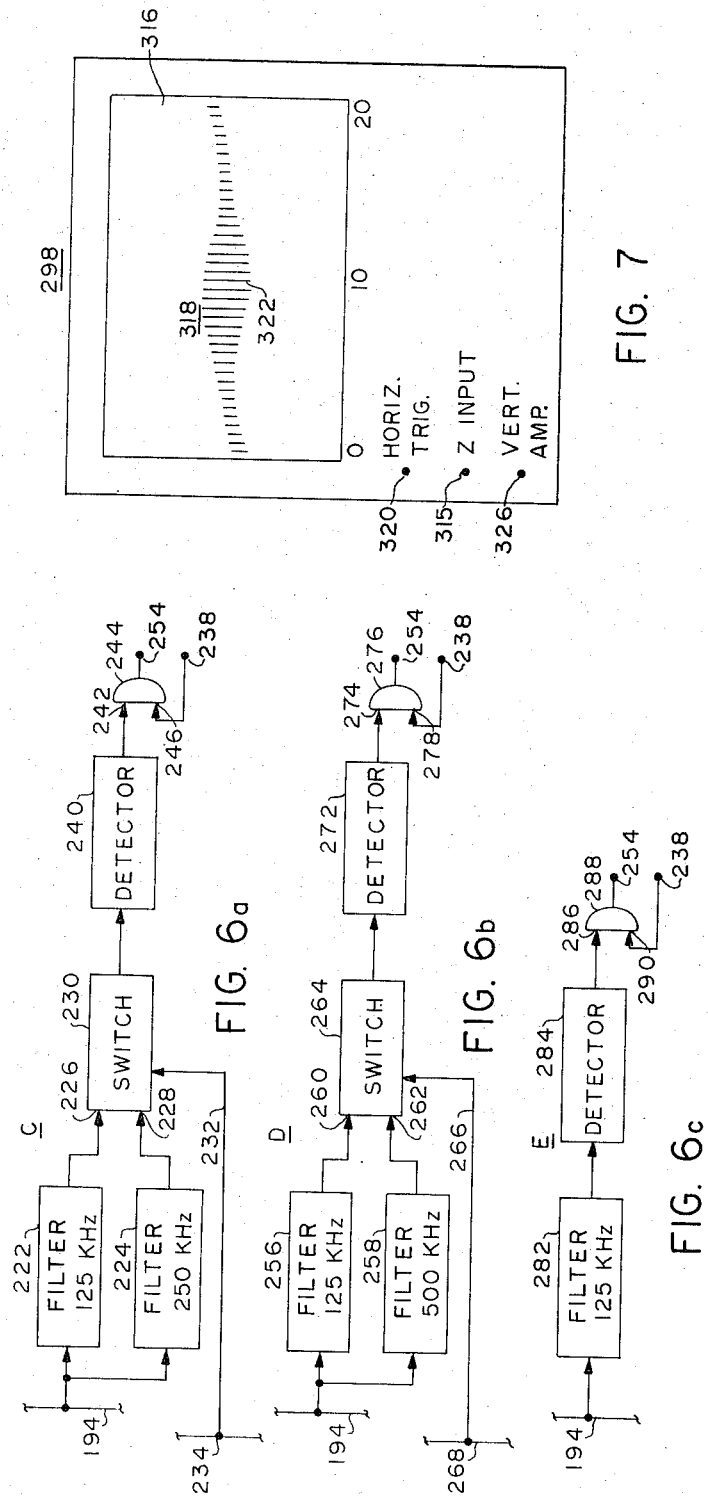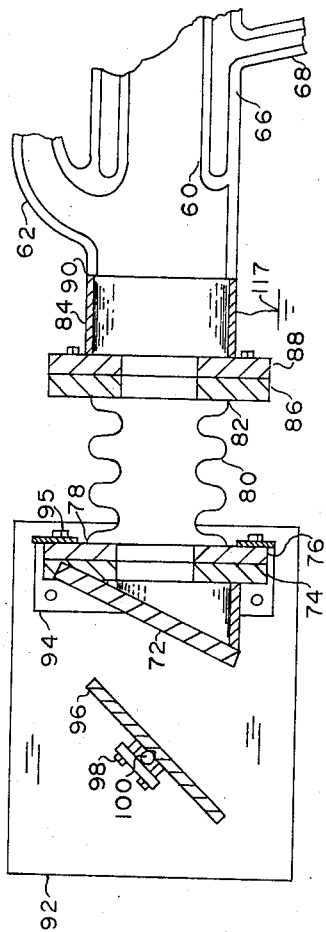

3,856,402

CLEAR AIR TURBULENCE DETECTOR

ORIGIN OF THE INVENTION

The invention described herein was made in the performance of work under a NASA Contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

This invention relates to a system for the remote measurement of the velocity and turbulence structure of the atmosphere.

2. General Description of the Prior Art

Many techniques and systems have been utilized to measure atmospheric turbulence. These have been concerned with detecting some variable or state of the atmosphere that is affected by turbulence and have included: passive and active acoustics, optical stellar scintillation detection, microwave scintillation of radio, star and satellite beacons, infrared and microwave backscatter, tropospheric bistatic radio scatter, and ultrasensitive radar.

A number of difficulties have arisen in utilizing one or more of the foregoing techniques or systems for airborne application. For example, excessively large antennas are required if microwave techniques are to be employed and difficulties in achieving adequate range and accuracy of velocity information arise with those techniques which rely on optical systems.

SUMMARY OF THE INVENTION

Accordingly it is the object of this invention to provide a system for the measurement of air turbulence suitable for use in an aircraft and capable of providing highly accurate measurements at a substantial range.

In accordance with the invention, a pulsed laser, doppler radar system has been devised. It propagates a train of short pulses of radiation, generated by a laser source, typically a $CO_2$ laser, the direction of propagation being the direction of flight of the aircraft. An optical receiver is then used to detect the backscattered return from the atmospheric aerosol. The length of the propagated pulse determines the spatial resolution in the atmosphere and also the doppler shift resolution. The radiation backscattered by atmospheric particulates is fed to an optical receiver in the aircraft and is doppler shifted by an amount $f_D$ where $f_D = 2V/\lambda$. V is the velocity component along the direction of pulse propagation between the aircraft and the air in the instantaneously illuminated volume and $\lambda$ is the wavelength of the laser. The turbulence detection capability of the system is a consequence of the simultaneous measurement of doppler shifts from different regions of the instantaneous pulsed volume in the atmosphere whence the turbulence in the air is inferred from the bandwidth of the backscattered signal. The distance to the turbulence is inferred from the round trip propagation time.

Precise frequency measurement capability is achieved by beating the scattered radiation with the continuous wave, highly stable, laser beam, a process which results in a beat frequency directly proportional to the velocity component. The pulsed laser source is derived from a stable C.W. laser source by pulse modulating the output of the laser. This technique assures the presence of a reference beam for the homodyne frequency conversion process employed.

BRIEF DESCRIPTION OF THE DRAWINGS

FIG. 4 is a sectional view of one end region of one of the amplifier tubes shown in FIG. 3.

FIG. 4 is a sectional view of one end region of one of the amplifier tubes shown in FIG. 3.

FIGS. 6a–6c are block diagrams of the three forms of filter-detection circuits employed in the spectral analysis portion of the system shown in FIG. 5.

FIG. 7 is a pictorial illustration of the indicator or display upon which the data developed by this system is displayed.

DESCRIPTION OF THE PREFERRED EMBODIMENT

Figure 1:
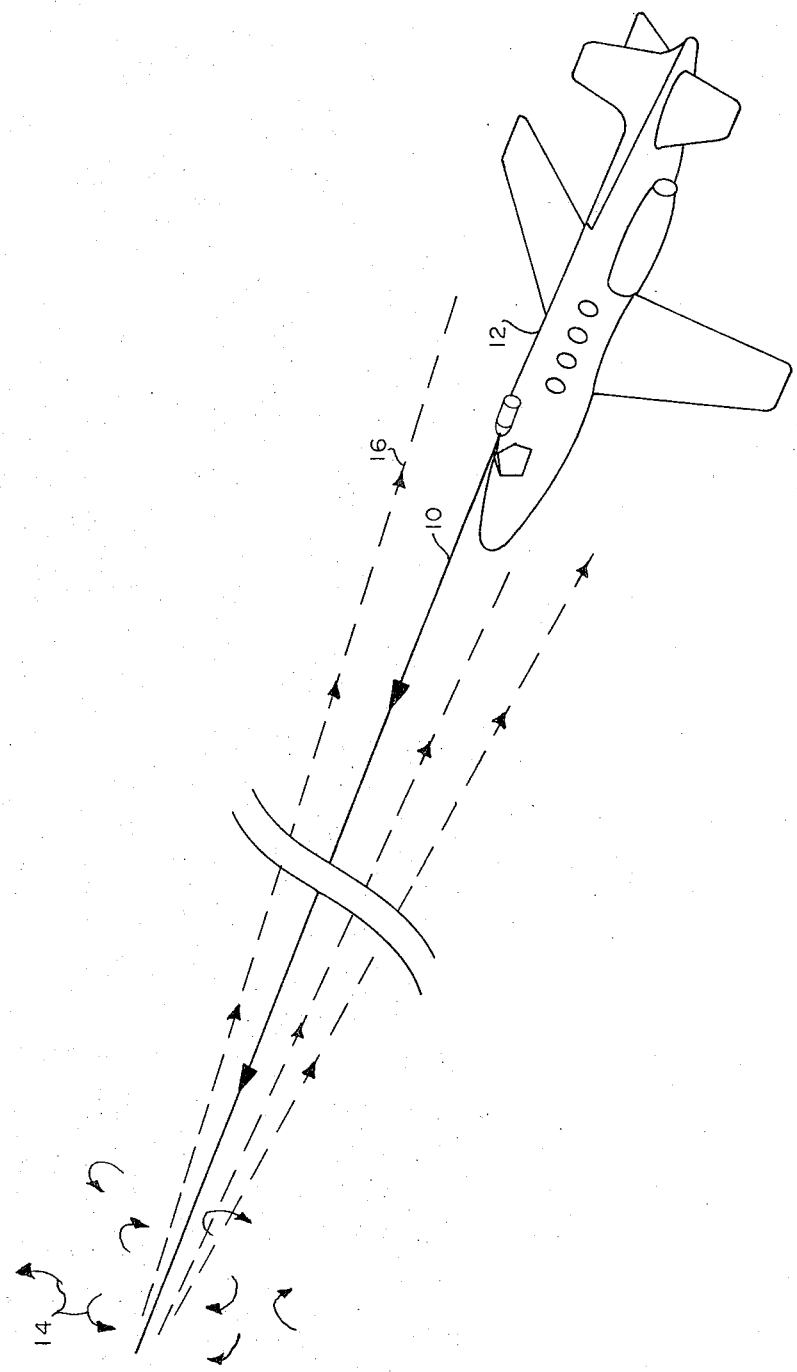
FIG. 1 is a schematic illustration of an application of the invention.

FIG. 1 illustrates generally an application of the laser detection system of the invention. Here the system is indicated to propagate a laser beam 10 forward of an aircraft 12. Upon impinging on atmospheric particles or aerosols 14, signals 16 are backscattered and collected by a light receiver and the doppler offset spectrum is determined and evaluated for range, wind speed and turbulence conditions.

MASTER OSCILLATOR

Figure 2:
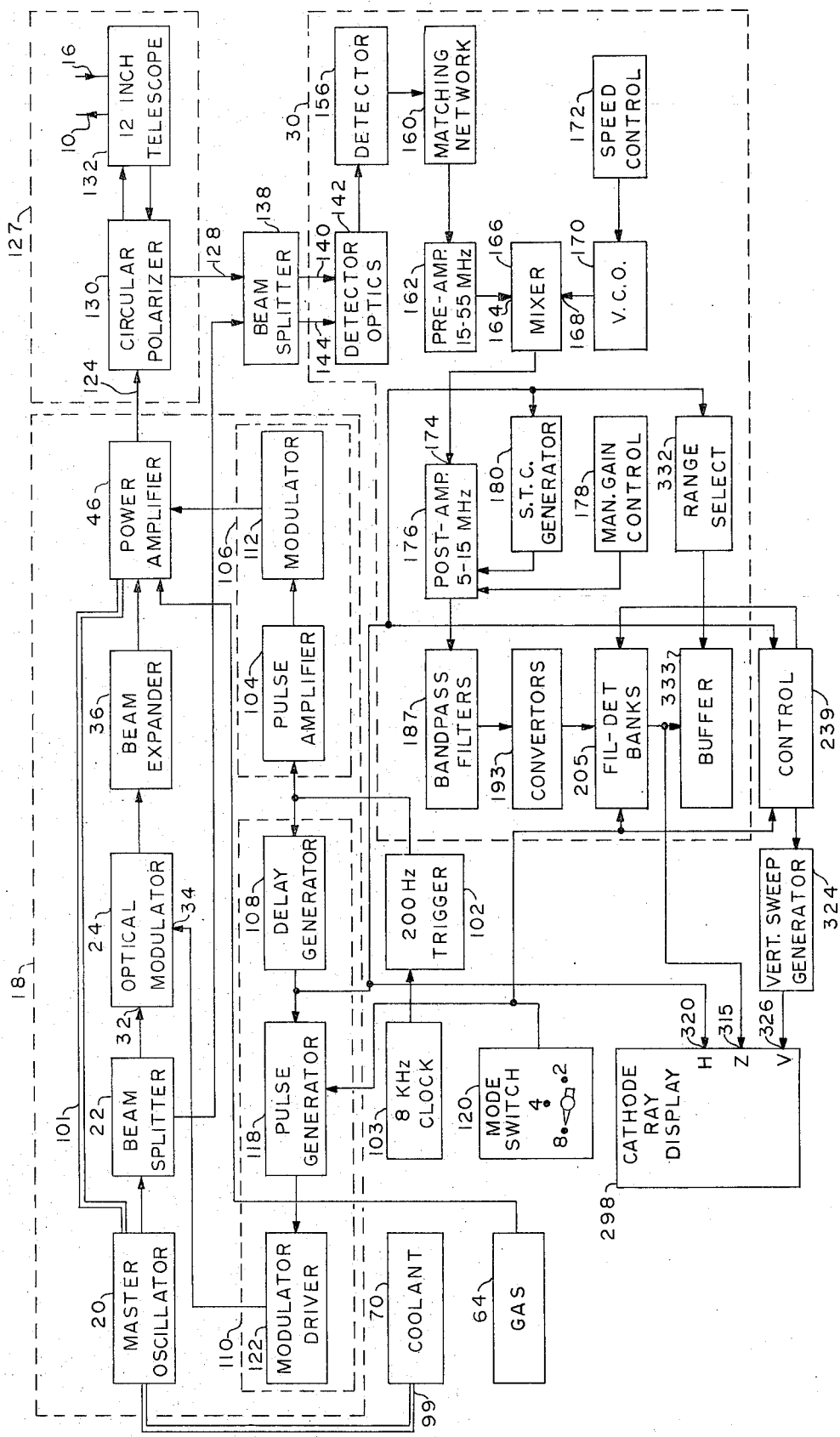
FIG. 2 is an electrical block diagram of the overall system of the invention.
Figure 3:
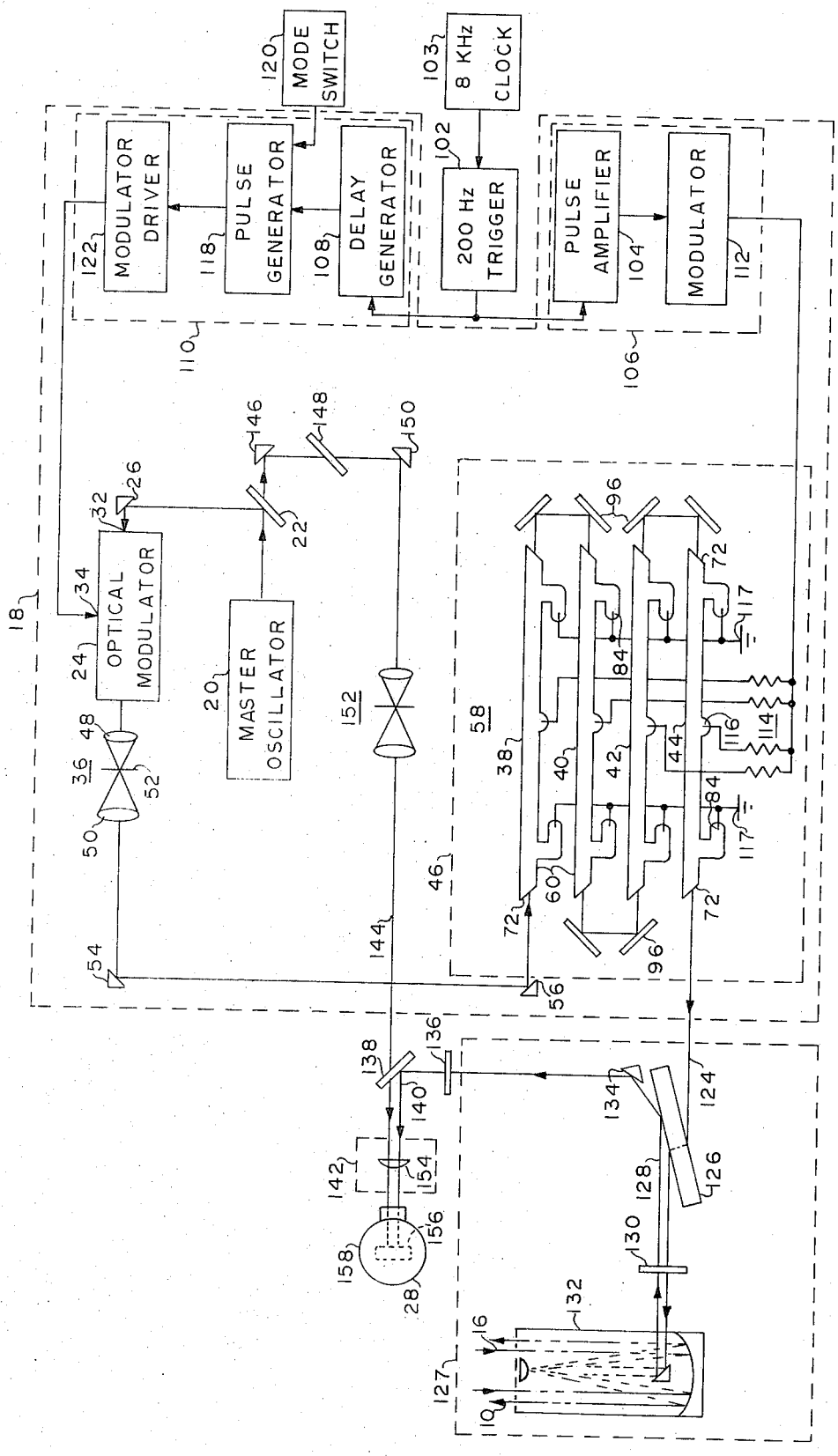
FIG. 3 is a schematic illustration of this system particularly illustrating the arrangement of the optical components.

With reference to FIGS. 2 and 3, laser transmitter 18 includes master oscillator 20 which is a single mode, single frequency and single P-line $CO_2$ laser, and is linearly polarized. Master oscillator 20 generates a continuous wave (C.W.) laser signal having a high degree of frequency stability at 10.6 microns with an output power of approximately 5 watts and having a beam diameter of 3 millimeters. A beamsplitter 22 (FIG. 3) is positioned at the output of oscillator 20 which directs most of the energy to optical modulator 24, by diverting mirror 26, while a small portion is directed to detector assembly 28 of receiver 30 in a manner to be further described, as a local oscillator source.

OPTICAL MODULATOR

In order to convert the C.W. output of stable oscillator 20 to an appropriate microsecond pulse required by the system, a gallium-arsenide type electro-optic modulator 24 is used.

Modulator 24 consists of a gallium-arsenide crystal placed between crossed polarizers, not shown. With no voltage on the crystal, the polarization of the beam at input 32 is not altered and no radiation is transmitted. When the correct voltage is applied to input 34, the crystal becomes bi-refringent and, in effect, becomes a half-wave plate, causing the polarization of a linear polarized beam to be rotated 90°. This beam, with its polarization rotated 90°, will pass through the second polarizer. In this way, voltage pulses applied to electro-optical modulator 24 produce optical pulses. The shape of the optical pulses are identical to that of the electrical pulses.

EXPANSION TELESCOPE

The 3 millimeter beam from modulator 24 is fed through expansion telescope 36 whereby it is expanded to 15 millimeters, to mate with the 15 millimeter bore diameter of linear tube 38, 40, 42 and 44 of laser power amplifier 46 (FIG. 3), to be described. Telescope 36 includes two anti-reflection lenses 48 and 50 having focal lengths of three and 15 inches, respectively.

In order to provide a laser beam with a uniform phase front, the beam is spatially filtered by placing a pinhole filter 52 at the focal point of the telescope. This filter 52 filters out all the stray radiation that fails to focus and thus reduces the tendency of power amplifier 46 to oscillate because of residual reflections. The beam from telescope 36 is directed into first tube 38 of power amplifier 46 by diverting mirrors 54 and 56.

POWER AMPLIFIER

Power amplifier 46 (FIGS. 3 and 4) includes four flowing gas discharge tubes 38, 40, 42 and 44, each having a length commensurate with the desired gain and provided with an inner diameter adapted to mate with the 15 millimeter output beam diameter of telescope 36, being preferably supported side by side upon a sturdy, light weight frame, not shown.

Each of amplifier tubes 58 is preferably formed of suitably tempered glass, such as that bearing the trade name of Pyrex, and is of a double-walled tubular construction (FIG. 4), having an inner envelope 60 provided with inlet and outlet tubulations 62 through which is fed a selectable mixture of flowing gases from gas source 64 (FIG. 2). Outer jacket 66, being integrally sealed at its opposite ends to inner envelope 60, is provided with inlet and outlet tubulations 68 interconnected to a source of coolant 70 (FIG. 2), preferably having a low dielectric constant, such as trichlorethylene. A laser beam is directed into and out of each of tubes 58 by Brewster angle window 72 being positioned at an angle of 55° 36 mins. (FIG. 4). Each of windows 72 is vacuum sealed by mating flanges 74 and 76 to outer end 78 of a non-corrosive, bellows type flexible coupling 80. Opposite end 82 of coupling 80 is vacuum sealed to cylindrical electrode 84 or tubes 58 by similar mating flanges 86 and 88, the inner end 90 of electrode 84 being joined to inner envelope 60. Each of windows 72 is adjustably attached to turnaround support block 92, by mounting bracket 94, attached by bolts 95 to mating flanges 74 and 76. When power amplifier 46 is assembled, as shown schematically in FIG. 3, retro mirrors 96 are suitably placed so as to direct the 15 millimeter laser beam, in serial fashion, through each of amplifier tubes 38, 40, 42 and 44, respectively, being adjustably secured by adjusting screws 98 to vertical support pin 100, in turn secured by means not shown, to block 92 (FIG. 4).

Tubes 58 are typically further supported at points intermediate the ends by spaced support brackets, not shown, attached to a suitable mounting frame.

The cooling liquid is recirculated about tubes 58 through the serially interconnected outer jackets 66 of tubes 58, in turn interconnected by conduits 99 and 101 and the cooling jacket, not shown, or master oscillator 20 to coolant source 70. A selectable mixture of the desired gases, typically carbon dioxide, nitrogen, and helium, is pumped, by a vacuum pump, not shown, through inlet and outlet tubes 62, being interconnected in parallel at adjacent ends of tubes 58, to input and exhaust manifolds, also not shown, adapted to assure an essentially equal gas flow through each of tubes 58.

The pulse repetition rate of the system is determined by 200 hertz trigger 102 which is a divide-by 40 divider having an input from 8 KHz oscillator 103. Sequential pulses from circuit 102 are fed to pulse amplifier 104 of power amplifier-driver 106, and to delay generator 108 of optical modulator driver 110. Pulse amplifier 104 amplifies the pulse from trigger 102 sufficiently to drive modulator 112. The output of modulator 112 is, in turn, coupled through current equalizing ballast resistors 114 (FIG. 3) to central electrodes 116 of amplifier tubes 58. Cylindrical electrodes 84 (FIG. 3) are connected to common ground 117. Modulator 112 provides an ionizing or "pump" pulse to central anodes 116 of tubes 58 sufficient to cause amplifier 46 to operate within a saturated gain mode, being typically 8 kv for tubes 58 less than 1.5 meters in length.

The leading edge of each delayed pulse from delay generator 108, triggers pulse generator 118, which outputs a 2, 4 or 8 microsecond pulse, as determined by the position of mode switch 120, being coupled as an input to modulator driver 122. The output of modulator-driver 122 is in turn coupled to input 34 of electro-optical modulator 24, which, upon the occurrence of each voltage pulse, typically 4 kilovolts in amplitude, gates a five watt optical pulse, of similar duration, from master oscillator 20, into input window 72 of amplifier tube 38 in a manner as previously described.

In passing through amplifier tubes 38, 40, 42 and 44 this initial 5 watt optical pulse is amplified, typically 1,000 times, to provide a vertically polarized output pulse of 5 kilowatts, at output window 72 of tube 44.

TRANSMIT-RECEIVE OPTICS

Pulsed beam 124 from power amplifier 46 is directed through 14 degree Brewster angle germanium polarizer plate 126 of transmit-receive optics 127. Polarizer plate 126 acts as a bi-directional isolator between the transmitted and received beams 124 and 128, respectively, as further explained below. Polarizer 126 passes essentially the entire vertically polarized beam from amplifier 46. Thus, accordingly, there is very little energy reflected back into amplifier 46. From polarizer plate 126 the plane polarized beam 124 is directed through quarter-wave plate 130, which converts it to circular polarization, being further directed into transmit-receive telescope 132. Telescope 132 expands the 15 millimeter beam to a 12 inch diameter transmitted signal 10 (FIG. 1).

A received signal 16 in the form of backscattered radiation from the illuminated atmospheric volume, is collected by telescope 132 (FIG. 3) and directed through quarter-wave plate 130. Plate 130 admits only that component of the received signal 16 which is polarized normal to the plane of incidence. The signal then reflects off the surface of polarizer 126 at an angle of 28° with respect to the horizontal, and is diverted by mirror 134 through half-wave plate 136, which converts it to a vertically polarized signal, being diverted by beam splitter 138, as one input 140 to detector optics 142.

DETECTOR OPTICS

A second input to detector optics 142 is the heterodyning signal 144 which is derived from master oscillator 20 as follows. A small amount of energy from master oscillator 20 is coupled through beam splitter 22 to diverting mirror 146. The signal is further attenuated through attenuator plate 148 and directed by a second diverting mirror 150 through expansion telescope 152, having a similar characteristics to telescope 36 heretofore described. The 3 millimeter beam is accordingly expanded to a 15 millimeter beam and passes through beam splitter 138 wherein it homodynes with the reflected return input signal 140, of like beam diameter but with doppler shifted frequency. The dual input signals 140 and 144, emerging from beam splitter 138, are focused by lens 154, to a small spot upon the surface of heterodyne detector 156 of laser receiver 30 (FIG. 2). Heterodyne detector 156 is preferably a copper doped germanium photo detector, having a 70 MHz frequency response and is enclosed in a DeWar 158, being cooled by means not shown, to liquid helium temperature. The output of detector 156 is the beat frequencies, or doppler shifts between the transmitted and received radiation which are directly related to the velocity and turbulence in the scattering source.

LASER RECEIVER

In order to preserve the preamplifier noise figure, the output of detector 156 (FIG. 2) is coupled through a suitable impedance matching network 160 to the input of broad band preamplifier 162.

Broadband preamplifier 162 is of sufficient bandwidth, typically 15 to 55 MHz, to pass a doppler spectrum, whose width is determined by the transmitted pulse and by the aerosol turbulence velocities and whose center frequency is determined by the relative velocity between the aerosols 14 and the aircraft 12, FIG. 1.

The output of amplifier 162 is coupled as one input 164 to mixer stage 166. A second input 168 to mixer 166 is provided by voltage controlled oscillator 170. The frequency of voltage controlled oscillator 170 is manually adjusted by speed control 172, which essentially substracts the effects of aircraft velocities by maintaining the output of mixer 166 within the 10 MHz, being the doppler band of interest generated by clear air turbulence effects. The output of mixer 166 is coupled to one input 174 of post-amplifier 176 preferably a video type amplifier having a relatively flat response over the 5 to 15 MHz range.

The maximum gain of amplifier 176 is typically 100 db, being manually adjustable within ±20 db limits by manual gain control 178, and automatically adjusted by sensitivity time control 180. Sensitivity time control 180 is essentially a modified ramp generator, having an output voltage which varies the receiver sensitivity in accordance with a range-squared law from 1 to 20 miles.

From zero to 1 mile, the I.F. gain is adjusted to minimum in order to minimize transients caused by the firing of the laser transmitter 18.

The input of sensitivity time control 180 is coupled to the output of delay generator 108 and is accordingly triggered each time a pulse is transmitted.

The output of post-amplifier 176 (FIG. 5) is coupled to the parallel connected inputs of adjacent bandpass filters 182, through 186. Each of filters 187 admits a 2 MHz band of frequencies between 5 and 7 MHz, 7 and 9 MHz, 9 and 11 MHz, 11 and 13 MHz and 13 and 15 MHz, respectively, providing an essentially flat response from 5 through 15 MHz.

The outputs of these filters 187 are coupled to the inputs of amplifying convertor stages 188 through 192, respectively. Each of the adjacent two MHz bands is converted to a common 2 to 4 MHz spectrum designated B1 through B5 at the outputs of convertors 193.

Outputs B1 through B5 of converters 193 are coupled to input lines 194 through 198 of five like 2–4 MHz band filter detector banks 200 through 204, respectively, herein referred to as filter detector banks 205 (FIG. 2).

Since each of filter detector banks 200 through 204 are identical, only one bank, bank 200, is shown in detail. Input lead 194 of filter detector bank 200 is coupled to the parallel connected inputs of 16 separate narrow band filter-detectors 206–221, which include three types of filter detectors bearing the further designation of C, D and E.

Each of eight C-type filter-detectors 206 through 213 (FIG. 6a) includes two filters 222 and 224 having bandwidths of 125 and 250 KHz, respectively, which span adjacent segments within the 204 MHz band B1. The inputs of filters 222 and 224 are coupled in parallel to input line 194 of filter detector bank 200 and have outputs coupled to the normally closed and normally open inputs 226 and 228, respectively. of switch 230. Switch 230 is selectively controlled by an input line 232 being coupled through 250 KHz select line 234 (FIG. 5) to contact T3 of mode switch 120, which is also further connected to input 236 of shift register 238, of control 239 to be further described.

The output of switch 230 is coupled to the input of detector 240, having an output connected to input 242 of gate 244. Gate 244 is enabled in a selectable sequence, by a second input 246 directed through gating input lines 248 to an appropriate sequential stage of shift register 238.

The output of gate 244 is coupled as an input to one of summing amplifiers 250 and 252 of a two level summing array 254. Each of D-type filter detectors 214 through 217 (FIGS. 6b) includes two filters 256 and 258 having bandwidths of 125 and 500 KHz, respectively.

The inputs of filters 256 and 258 also coupled in parallel to input line 194 (FIG. 5) of filter detector bank 200 and have outputs coupled to normally closed and normally open inputs 260 and 262, respectively, of switch 264. Switch 264, is coupled through 500 KHz select line 268 to contact T4 of mode switch 120, in turn connected to input 270 of shift register 238. The output of switch 264 is coupled to the input of detector 272, having an output coupled to input 274 of gate 276.

Gate 276 is enabled in a selectable sequence by a second input 278, directed through gating input lines 248 to an appropriate sequential stage of shift register 238. The output of gate 276 of each of D-type filters 214 through 217 is coupled as one input to summing amplifier 280 of summing array 254.

Type E filters 218 through 221 (FIG. 6c) include a single 125 KHz filter 282 having an input coupled to input line 194 of filter bank 200, and with an output coupled to detector 284. The output of detector 284 is in turn coupled to input 286 of gate 288, being sequentially enabled by a second input 290 directed through gating input lines 248 to an appropriate stage of shift register 238. The output of gate 288 is connected as one input to summing amplifier 292 of summing array 254. The outputs of summing amplifiers 250, 252, 280 and 292 are coupled as inputs to summing amplifier 294 of summing array 254. The output of amplifier 294 is connected as one input to final summing amplifier 296. The output of each of similar summing arrays 254 of filter detector banks 201, 202, 203 and 204 is coupled, through common terminals a, b, c and d, respectively, as an input to final summing amplifier 296. Thus a signal, indicative of backscatter frequency, gated from any individual filter-detector, is fed in a serial format, in a manner to be described, to the output of final summing amplifier 296, which is coupled to the Z axis input of cathode ray type display 298, to be further described.

Each of filter-detector banks 200 through 204 is selectively converted, by mode select 120, into sixteen-125 KHz, eight 250 KHz or four 500 KHz increments of the 2 to 4 MHz bands B1 through B5, respectively. Thus the entire 5 to 15 MHz band is divided into 80, 40 or 20 narrow bands matched respectively to an 8, 4 or 2 microsecond transmitted pulse width. Each of selected 125 KHz, 250 KHz or 500 KHz filters of filter banks 200 through 204 is sampled by shift register 238 of control 239, described below, at a time interval equal to the reciprocal of its bandwidth, being an interval of 8, 4 and 2 microseconds, respectively.

Figure 5:
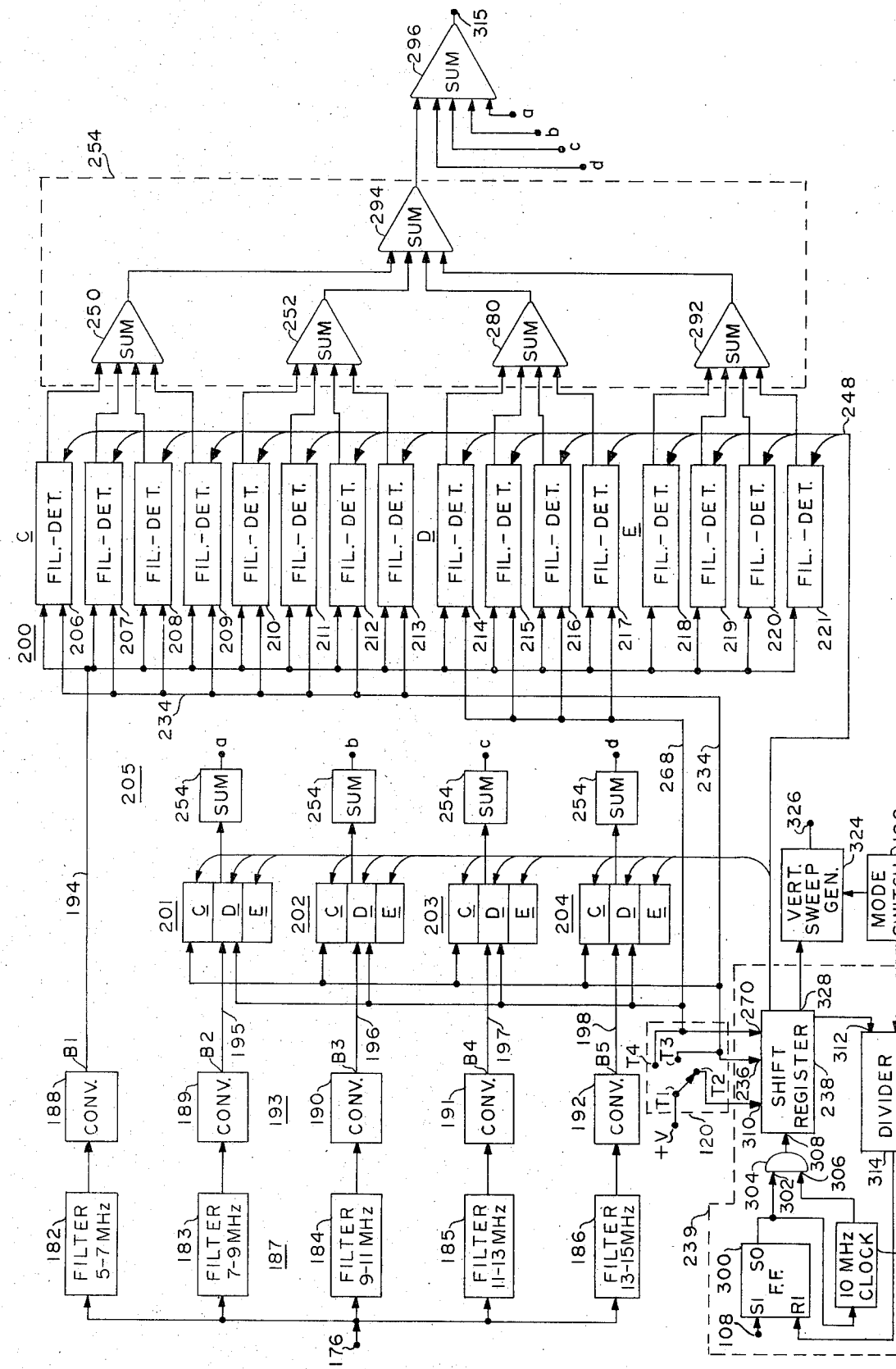
FIG. 5 is an electrical block diagram of the spectral analysis portion of the system.

Control 239 includes flip-flop 300 having set input SI coupled to the output of delay generator 108 of modulator drive circuitry 110 (FIG. 2), and set output SO connected to enable input 302 of gate 304 and to the initiate input of 10 MHz clock 307. A second input 306 of gate 304 is coupled to the output of 10 MHz clock 307 and gate 304 has an output coupled to shift input 308 of selectable length shift register 238. Shift register 238 is adapted to act as a ring type counter wherein a positive signal, or one, employed as an enabling signal, is inserted into the first, or least significant stage and shifted to the next more significant stage upon the occurrence of each 10 MHz shift pulse. Shift register 238 is internally gated to provide 80, 40 or 20 sequential stages as determined by position of mode switch 120, having contacts T2, T3 and T4, as previously described, coupled to inputs 310, 236 and 270, respectively, of shift register 238. For example, with mode switch positioned for the 8 microsecond mode of operation, as shown in FIG. 5, shift register 238 is 80 stages in length and generates sequential outputs of the 80 stages coupled to the enable inputs 246, 278 and 290 (FIGS. 6a, b and c) of each of gates 244, 276 and 288, respectively, of filter detectors 206–221 (FIG. 5) of each of filter detector banks 200–204, respectively. Only the 125 KHz filter is in circuit in each of filter-detectors 206–221 since switches 230 and 264 (FIGS. 6a and 6b) are not operated. Output 312 of shift register 238 is internally coupled by mode switch 120 to provide an input to divider 314 upon the completion of each sampling of 80 filter detectors. Divider 314 is internally connected by mode switch 120 to divide-by-25. Accordingly, the output of divider 314 resets flip-flop 300 upon the completion of 25 eight microsecond pulses, thus completing one 20 mile range sweep of 200 microseconds duration, in a manner to be further described. When mode switch 120 is set to the 4 microsecond position a positive voltage is connected through contacts T1 and T3, to 250 KHz select line 234, and to input 236 of shift register 238. A 250 KHz filter is thus switched into the circuit in each of eight C-type filter-detectors 206 through 213 of each of filter banks 200 and 204. Shift register 238 is shortened to 40 stages in length by positive signal at input 236, and generates sequential outputs of the 40 stages coupled through gating lines 248 to the sampling input 246 (FIG. 6a) of each of C-type filter-detectors 206 through 213. Divider 314 is internally connected by mode select switch 120 to divide-by-50. Thus upon the completion of 50 4-microsecond transmitted pulses, flip-flop 300 is reset. When mode switch 120 is set to the 2 microsecond mode of operation a like positive voltage is applied through contacts T1 and T4 of switch 120 to 500 KHz select line 268 and to input 270 of shift register 238. A 500 KHz filter is switched into the circuit in each of D-type filter-detectors 214 through 217 (FIG. 6b) and shift register 238 is internally shortened to 20 stages. Accordingly, an output from each sequential stage of shift register 238 is then coupled to the sampling input 278 (FIG. 6b) of D-type filter-detectors 214 through 217 of each of filter-detector banks 200 through 204. Divider 314 is now internally connected by mode select 120 to divide-by-100, thus resetting flip-flop 300 upon the completion of 100 2-microsecond pulses from transmitter 18.

Successive sampling of a selected group of 80, 40 or 20 filter-detector outputs, hereinafter referred to as channels, produces discrete voltages, in a serial format, which are indicative of turbulence velocity, at the output of final summing amplifier 296. These outputs are coupled, as previously mentioned, through common terminal 315 to the Z axis input of cathode ray type display 298 (FIG. 7), thereby modulating the display brightness in accordance with the filter detector outputs. Display 298 indicates the range of turbulence from an aircraft along the horizontal or X axis of phosphor screen 316. The velocity of turbulence, as a function of doppler frequency, is indicated by a series of Y, or vertical coordinates 318 in the form of short line segments, which are the detectable outputs of sampled filter-detectors. As a further aid in displaying information from backscatter returns, each of detectors 240, 272 and 284 of filter-detector types C, D and E, respectively, (FIGS. 6a through c), may include multiple level threshold outputs or quantizers which are adjusted and sampled in a manner to selectively reduce switching transients and noise.

Multiple threshold outputs, when appropriately encoded, may further provide a means of identifying the true spectral width of a signal which is passed by two or three adjacent filters.

The horizontal or range trace, of 200 microseconds duration, is produced by a saw tooth generator integral with display 298 which is triggered upon the occurrence of each transmitted pulse, the horizontal trigger input 320 being coupled to the output of delay generator 108 of modulator drive circuitry 110 (FIG. 2). Each vertical line 322 is produced by external vertical sweep generator 324. Vertical sweep generator 324 provides a saw tooth waveform of 8, 4 or 2 microseconds duration, as determined by position of mode switch 120, in accordance with the time required to sample 80, 40 or 20 filter-detector channels, respectively, and has an output coupled to vertical amplifier input 326 of display 298. Vertical sweep generator 324 is triggered by output 328 of shift register 238 (FIG. 5), which outputs a pulse upon the insertion of each logical one in the least significant stage of register 238. Accordingly, a vertical trace is initiated each time the first filter-detector of a selected group of channels is sampled. Thus, within a time equal to the reciprocal of the bandwidth, all of the selected filters are sampled and displayed upon an adjacent vertical line 322 of display 298. There is illustrated in FIG. 7 a typical return from clear air turbulence occurring between approximately the 7 to 12 mile ranges forward of the aircraft, the maximum disturbance being at about 10 miles. Illuminated segments 318 occurring along vertical traces 322 at a 10 mile range are longer in extend, therefore indicate spectral spread which implies greater turbulent velocities.

Viewing screen 316 of display 298 is coated with phosphors having a decay time of 3/10 seconds, typically, which, at a 200 Hz transmit rate, integrates 60 returns at C.A.T. information, thus providing a more stable display for an observer. In order to display and record turbulence at a desired range, as selected by range select 332 (FIG. 2), returns from 80 channels may be sampled and stored in a buffer 333. These stored samples would then be serialized, while being transferred into a digital integrator, not shown, wherein the returns are integrated during the subsequent sampling intervals. Upon the termination of the integration period, the accumulated data would be strobed into a second buffer storage adapted to read the data onto magnetic tape in a suitable format, during a subsequent like number of sampling intervals. An analog display of the sampled data would then be provided by a cathode ray type display, not shown, similar to display 298, previously described.

OPERATION OF THE SYSTEM

Referring first to FIG. 1, with coolant supply 70 and gas supply 64 having been activated, power is then applied to the electrical transmit-receive portion of the system.

First, mode switch 120 is positioned to one of the 8, 4 or 2 microsecond modes of operation, thus enabling pulse generator 118 to output an 8, 4 or 2 microsecond pulse, respectively. Further, as previously described, an output from mode switch 120 modifies shift register 238 and divider 314 of control 239 (FIG. 5) and vertical sweep generator 324, to suitably analyze and display velocity and range of backscatter return signals from laser receiver 30 (FIG. 2).

For the purpose of this description, it is assumed that a search for turbulence is made while operating the system in the 8 microsecond mode. Accordingly, mode switch 120 is set to the 8 microsecond position.

The leading edge of each pulse of 200 Hz trigger 102 (FIG. 2) triggers delay generator 108 of optical modulator drive circuit 110 and also causes pulse amplifier 104 to output a 150 microsecond pulse to modulator 112 which is turn provides an ionizing pulse to each of central anodes 116 of power amplifier tubes 58, through ballast resistors 114 (FIG. 3).

After a suitable delay, pulse generator 118 of modulator driver 110 is triggered by an output of delay generator 108. Pulse generator 118 enables modulator driver 122 for 8 microseconds which in turn outputs an 8 microsecond pulse to optical modulator 24.

Modulator 24 thus becomes birefringent, gating an 8 microsecond optical pulse from master oscillator 20 through beam expander 36 into power amplifier 46. An amplified 8 microsecond optical pulse is coupled through circular polarizer 130 into transmit-receive telescope 132 (FIG. 2).

Simultaneously, an output of delay generator 108 sets flip-flop 300 of control 239 (FIG. 5) and triggers horizontal input 320 of cathode ray display 298 (FIG. 7), initiating a 200 microsecond range sweep. Set output SO of flip-flop 300 (Fig. 5) enables input 302 of gate 304 which gates 10 MHz shift pulses from clock 307 and strobes a "one" into the first shift register 238.

When a "one" is set into the first stage of shift register 238, information is gated from the first filter-detector 206 of filter bank 200 and vertical sweep generator 324 is triggered by output 328, initiating a vertical sweep of 8 microseconds duration. Scattered energy is collected by transmit-receive telescope 132 and combined with the local oscillator signal from master oscillator, then detected by optical detector 156. The frequency of the detected output signal is a measurement of a component of the atmospheric velocity.

At the output of detector 156 a band of frequencies between 15 and 55 MHz is coupled through matching network 160 to preamplifier 162. The output of preamplifier 162 is coupled as one input to mixer 166, a second input 168 being the output of voltage controlled oscillator 170. The frequency of voltage controlled oscillator 176 is adjusted in accordance with the velocity of the aircraft, to produce a band of frequencies between 5 and 15 MHz at the output of mixer 166, which contains the doppler frequencies relative to atmospheric turbulence.

This 10 MHz band of frequencies is then amplified by postamplifier 176, the output of which is connected to the inputs of five 2 MHz filters 182 through 186 (FIG. 5) spanning 5-7, 7-9, 9-11, 11-13 and 13-15 MHz increments, respectively, of the band. The respective outputs of these filters are coupled to convertors 188 through 192 which convert each of the different 2 MHz bands to a common 2 to 4 MHz band, as previously described.

Thus upon the emergence of a transmitted pulse from telescope 132, vertical and horizontal traces are initiated in cathode ray display 298. Since a "one" is also gated into the first stage of shift register 238, any information in filter-detector 206 of filter bank 200 is coupled through summing array 254 and final summing amplifier 296 to the Z axis input of display 298.

At 1/10 microsecond intervals, the "one" in shift register 238 is shifted by 10 MHz clock 307, to the next more significant stage which gates information from an adjacent higher frequency 125 KHz filter detector.

Thus during an 8 microsecond interval all 80 filter-detectors are sampled and any detectable output of each is coupled in a serial format at one-tenth microsecond intervals to the Z input of display 298 and displayed as an illuminated segment on screen 316.

Output 312 of shift register 238 steps divider 314 by one count after each complete sampling of 80 gates and a vertical sweep is triggered upon the insertion of a subsequent "one" in the first stage of register 238.

Since the region of observation propogates through space at one-half the velocity of light, upon the completion of a first sampling cycle, a 4,000 foot region extending directly ahead of the aircraft is examined. Thus during 25 like 8 microsecond intervals, similar adjacent 4,000 foot regions extending to a range of 20 miles are examined and processed in a similar manner, the scattered returns from each volume being displayed as a doppler frequency on an adjacent vertical line 322 of display 298.

When shift register 238 has completed 25 cycles, an output of divider 314 resets flip-flop 300 to complete a first 200 microsecond or 20 mile range sweep interval. When a search is made in the 4 microsecond mode of operation a similar sequence of events occurs, the only difference being that shift register 238 is then shortened to a 40 stage configuration, vertical sweep generator 324 produces a 4 microsecond sweep, and divider 314 is modified to divide by 50. Only the eight type C filter-detectors 206–213 of filter banks 200 through 204 (a total of 40), having a 250 KHz filter in circuit, are sampled in a manner as heretofore described.

Thus flip-flop 300 of control 239 is "set" upon the emergence of each transmitted pulse, and shift register 238 performs sampling of forty 250 KHz channels during each 4 microsecond interval at a 10 MHz rate, to examine each of 50 illuminated volumes, 2,000 feet in length, forward of the aircraft. Scattered returns are displayed in a similar manner as described above in the form of series of segments on adjacent 4 microsecond vertical lines of display 298.

Upon the completion of 50 sampling cycles of shift register 238 an output of divider 314 resets flip-flop 300 to complete approximately one 20 mile (100,000 feet) search.

When the system is operated in the 2 microsecond mode, the transmitted pulse length is 2 microseconds and shift register 238 is shortened to 20 stages. Divider 314 is modified to divide by a factor of 100 and vertical sweep generator 324 produces a 2 microsecond vertical sweep.

At the occurrence of a transmitted pulse, flip-flop 300 is again set, enabling shift register 238 to perform 100 sampling cycles of the four D type filter-detectors 214 through 217 of filter banks 200 through 204 (a total of 20), having a 500 KHz filter in circuit. One hundred 1,000 foot regions forward of the aircraft are then examined, and the returns from each are displayed, as before, upon 100 adjacent vertical lines of display 298, being 2 microseconds in duration.

Upon the completion of 100 scans, an output of divider 314 resets flip-flop 300 in preparation for a subsequent 20 mile search.

What is claimed is:
1. A clear air turbulence detector comprising:
laser light generating means for providing as an output a narrow beam of light energy of a predetermined frequency;
pulse generating means for providing a train of electrical pulses at a preselected rate and of a preselected width;
modulation means responsive to said laser light generating means and said pulse generating means for providing pulses of said beam of light energy corresponding in time to the pulse output of said pulse generating means;

optical transmission means responsive to the output of said modulation means for transmitting pulses of narrow beam light in a selected direction and for receiving reflected returns of said pulses of said light;
detection means responsive to an output of said optical transmission means of reflected returns of light for providing as an output, discrete electrical signals of a frequency proportional to the velocity of aerosols from which the light returns are reflected;

filter means responsive to the output of said detection means for providing a plurality of outputs, each output being selectively responsive to signal frequencies within a selected discrete band of frequencies within a selected overall range of frequencies of the detector;
gating means coupled to said filter means for passing a selected sequence of outputs of said filter means as a set of outputs for each of a plurality of selected ranges from the clear air turbulence detector of aerosols providing reflected returns of light; and
indicating means responsive to said filter means for indicating the velocities of aerosols providing returns and the distance of said aerosols from said detector.

2. A clear air turbulence detector as set forth in claim 1 wherein:
said modulation means is connected to said laser light generating means and modulates the output of said laser light generating means to provide said pulses of said beam of light energy to said light amplifier;

said optical transmission means includes a light amplifier; and
said pulse generating means includes means for providing pulse operating power to said light amplifier during pulse intervals in which said laser light generating means is providing pulsed light inputs to said light amplifier;
whereby said light amplifier is turned on during periods when it is receiving input pulses of light and is turned off for at least most of the interval between pulses of input light to said amplifier.

3. A clear air turbulence detector as set forth in claim 2 wherein said light amplifier comprises a plurality of tubes, arranged serially, wherein light is directed from end-to-end through the tubes and said tubes are filled with a gas adapted to provide tuned light amplification at the output frequency of said laser.

4. A clear air turbulence detector as set forth in claim 3 wherein said light amplifier includes at least two said tubes positioned side-by-side and at least two adjacent ends of said tubes each includes right-angle mirrors for coupling the light output from the end of one tube to a light input at the end of the other tube.

5. A clear air turbulence detector as set forth in claim 4 further comprising means supporting said mirrors for adjustably positioning said mirrors with respect to the ends of said tubes.

6. A clear air turbulence detector as set forth in claim 1 wherein said filter means comprises a plurality of sets of bandpass filters, each set comprising a plurality of bandpass filters with each bandpass filter of a given set having substantially the same selected bandpass, the bandpass filters of a given set together covering said selected range of frequencies, and wherein the bandpass filters of different sets differ in bandwidth and number of filters to provide, selectively, as between sets of filters, degrees of velocity selectivity.

7. A clear air turbulence detector as set forth in claim 6 wherein:
  said pulse generating means comprises means for providing a like plurality of different pulse widths to that of the number of sets of bandpass filters;
  said gating means includes gating signal generating means responsive to and synchronized with said pulse generating means for generating a selected discrete number of signals between said pulses;
  said gating means is further responsive to said gating signal generating means for passing, sequentially, in a progressive sequence varying directly with the output frequency of said detection means, the outputs of a selected said set of of bandpass filters a plurality of times between said pulses whereby a plurality of velocities at a plurality of ranges are discretely provided as outputs; and
  switching means connected to said pulse generating means for selecting a said pulse width and connected to said gating means for selecting a particular said set of bandpass filters to be gated.

8. A clear air turbulence detector as set forth in claim 1 wherein:
  said filter means comprises:
    a plurality of bandpass filters, together, covering, in equal range increments, said selected range of frequencies;
    a like plurality of frequency converters to that of said bandpass filters, each converter being responsive to one of said bandpass filters for converting the frequencies passed to the same band of frequencies produced by the other said converters, each band, however, remaining representative of a different velocity range; and
    first, second and third sets of narrow bandpass filters of progressively greater bandwidth, respectively, fed from the output of each said converter and wherein the number of narrow bandpass filters times the bandwidth of one of these filters of a given set equals the output bandwidth of a said converter;
  said pulse generating means includes means for generating first, second and third said pulses of progressively greater width, respectively;
  mode switching control means for selectively controlling said pulse generating means for providing said first, second or third pulses and for controlling said gating means for selectively causing said first set of bandpass filters to be progressively gated between the generating of successive said first pulse width pulses, said second set of bandpass filters to be progressively gated between the generation of successive said second pulse width pulses and said third set of bandpass filters to be progressively gated between the generation of successive said third pulse width pulses;
  whereby selected degrees of velocity signal selectivity is obtained.

9. A clear air turbulence detector as set forth in claim 8 wherein:
  said gating means includes gating signal generating means responsive to and synchronized with said pulse generating means for selectively generating a first discrete set and number of signals between said first pulses, a second discrete set and number of signals between said second pulses, and a third discrete set and number of signals between said third pulses; and
  said gating means includes means responsive to said first set of signals for sequentially gating a first plurality of times the bandpass filters of said first set of narrow bandpass filters, said gating means is responsive to said second set of signals for gating a second plurality of times the bandpass filters of said second set of narrow bandpass filters, and said gating means is responsive to said third set of signals for gating a third plurality of times the bandpass filters of said third set of narrow bandpass filters;
  whereby said first, second and third sets of narrow bandpass filters are selectively gated for the selective indication of signals representative of different turbulence velocities occurring in different distance ranges from said detector.

10. A clear air turbulence detector as set forth in claim 9 wherein said indicating means comprises a cathode ray tube display including a controlled electron beam and further including:
  first sweep signal generating means responsive to said pulse generating means for moving said electron beam along one axis of said cathode ray tubes display for each generation of a said pulse to provide a beam position on said cathode ray tube indicative of range of a reflection from an aerosol received by said detector;
  second sweep signal generating means responsive to each said signal from said gating signal generating means for moving said electron beam along an opposite axis to said one axis, thus providing a selected number of sweeps between said pulses; and electron beam gating means responsive to said reflected returns of said pulses of light for concurrently gating "on" said electron beam;
  whereby the range of a given reflected light return is measured along said one axis and the velocity of a said return is measured along said second axis.

11. A clear air turbulence detector as set forth in claim 10 wherein:
  said first pulses are each of a duration of 8 microseconds, said second pulses are each of a duration of 4 microseconds and said third pulses are each of a duration of 2 microseconds;
  said selected range of frequencies is between 5 and 15 MHz;
  there are five each of said bandpass filters and converters, each covering 2 MHz increments;
  there are 80-125 KHz said first narrow bandpass filters, 40-250 KHz said second narrow bandpass filters and 20-500 KHz said third narrow bandpass filters;
  the pulse repetition rate of said pulse generating means is 200 pulses per second; and
  there are 4,000 said first signals between succeeding said first pulses to provide 25 velocity indications at 4,000 foot range increments outward from said detector, there are 8,000 said second signals between succeeding second pulses to provide 50 velocity indications at 2,000 foot range increments, and there are 16,000 of said third signals between succeeding third pulses to provide velocity indications at 1,000 foot range increments.

12. A clear air turbulence detector as set forth in claim 1 wherein said detection means includes mixer means and means responsive to the speed of movement of the turbulence detector for converting said discrete electrical signals provided by said detection means into a said selected overall range of frequencies as the output of said detection means which is compensated for the said speed of movement of the turbulence detector.

* * * * *